H. MÜLLER.
ELECTRIC MOTOR.
APPLICATION FILED AUG. 29, 1907.

953,219.

Patented Mar. 29, 1910.

WITNESSES:
Lester H. Fulmer.
J. Ellis Glen.

INVENTOR
HEINRICH MÜLLER.
BY Albert G. Davis
ATTY.

UNITED STATES PATENT OFFICE.

HEINRICH MÜLLER, OF BERLIN, GERMANY, ASSIGNOR TO GENERAL ELECTRIC COMPANY, A CORPORATION OF NEW YORK.

ELECTRIC MOTOR.

953,219.  Specification of Letters Patent.  Patented Mar. 29, 1910.

Application filed August 29, 1907. Serial No. 390,626.

*To all whom it may concern:*

Be it known that I, HEINRICH MÜLLER, a subject of the King of Prussia, residing at Berlin, No. 58, Germany, have invented certain new and useful Improvements in Electric Motors, of which the following is a specification.

My invention relates to an electric motor having two rotatable members, one fastened to the shaft and the other free to rotate.

More specifically my invention relates to an electric motor with two rotatable members, one of which is fastened to the shaft and the other is free to rotate and drives a ventilator.

My device is particularly adapted to induction motors, which are frequently used in practice in such a manner that they stand still under current but exert a balancing torque, such as those used for releasing brakes in cranes, the lifting motors for lifting-tables in rolling mills, or the slip-regulating motors in electric hoist systems. In all such motors, all of the electrical energy supplied is transformed into heat, so that the types used must be disproportionately large and costly, in order that the heating may be kept within permissible limits.

By the use of my invention good ventilation is supplied the motors, making it possible to use smaller and cheaper machines.

The essence of my invention consists in the feature that the rotor whose torque is to be utilized is divided into two unequal parts situated side by side, the smaller of which, formed as a ventilator, is free to rotate upon the common shaft. The larger part of the rotor is designed to exert a large torque, and is provided with ventilating ducts or channels. Under the influence of the rotating field created in the stator, the larger stationary part of the rotor exerts the desired torque, while the smaller part, being free to turn, rotates according to the rotary field, and blows air through the ducts or channels above mentioned, this continuing as long as the stator is in circuit, that is as long as the motor is required to exert torque.

For a better understanding of my invention reference may be had to the drawings in which my invention is applied to an induction motor, of which—

Figure 1:
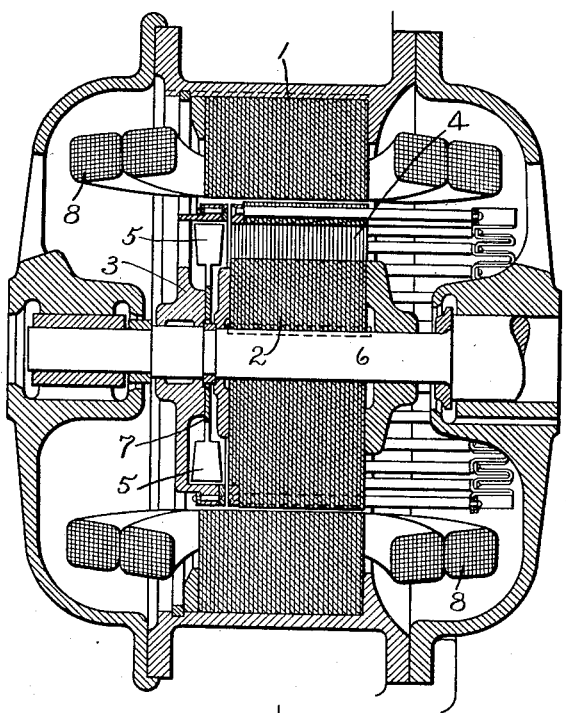
Figure 2:
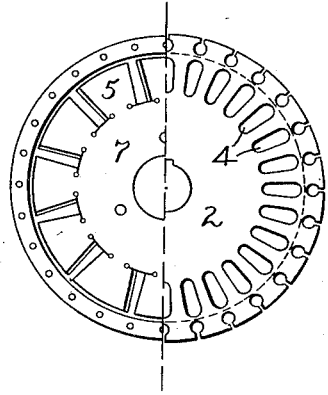
Figure 3:
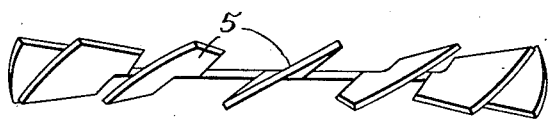

Figure 1 is a vertical section; Fig. 2 is a view of the rotor at right angles to that shown in Fig. 1 and shows the two rotors, half of the one formed as a ventilator being cut away; and Fig. 3 is an enlarged view of the fan.

1 is the stator with the windings 8. The rotor 2 has air ducts 4 and is keyed to the shaft 6, which exerts the torque. The rotor 3, of small mass is fastened to the fan 5, both of which are free to rotate on the shaft 6. The fan as illustrated is made of a punching 7, but fan blades could be mounted directly on the rotor 3.

Although I have illustrated my invention as applied to an induction motor, it is evident that it may be used in connection with any electric motor. As a ventilating device it may be used with motors which are braked while current is still supplied to the windings, or which have the current reversed in their windings to brake them.

What I claim as new and desire to secure by Letters Patent of the United States, is,—

1. In an electric motor, two rotatable members situated side by side, one fastened to and the other free to rotate about the shaft, and a ventilator driven by the latter member.

2. In an electric motor, two rotatable members situated side by side, one fastened to and the other free to rotate about the shaft, the latter member being provided with fan blades.

3. In an induction motor, a stator and two rotors, said rotors situated side by side one being fastened to and the other free to rotate about the shaft, and a ventilator driven by the latter member.

4. In an induction motor, a stator and two rotors, said rotors situated side by side one being fastened to, and the other free to rotate about the shaft, the latter member being provided with fan blades.

5. In an induction motor, a stator and two rotors, one being fastened to the shaft and provided with air ducts, and the other being free to rotate, and a ventilator driven by the latter member, said ventilator registering with said air ducts.

6. In an induction motor, a stator and two rotors, said rotors being situated side by side, a shaft, one of said rotors being fastened to and the other free to rotate about said shaft, said rotor fastened to the shaft being provided with air ducts, and a ventilator driven by the rotor free to rotate about the shaft, said ventilator registering with said air ducts.

In witness whereof, I have hereunto set my hand this tenth day of August 1907.

HEINRICH MÜLLER.

Witnesses:
JULIUS RÜNDANT,
OSKAR SINGER.